Patented Apr. 18, 1933

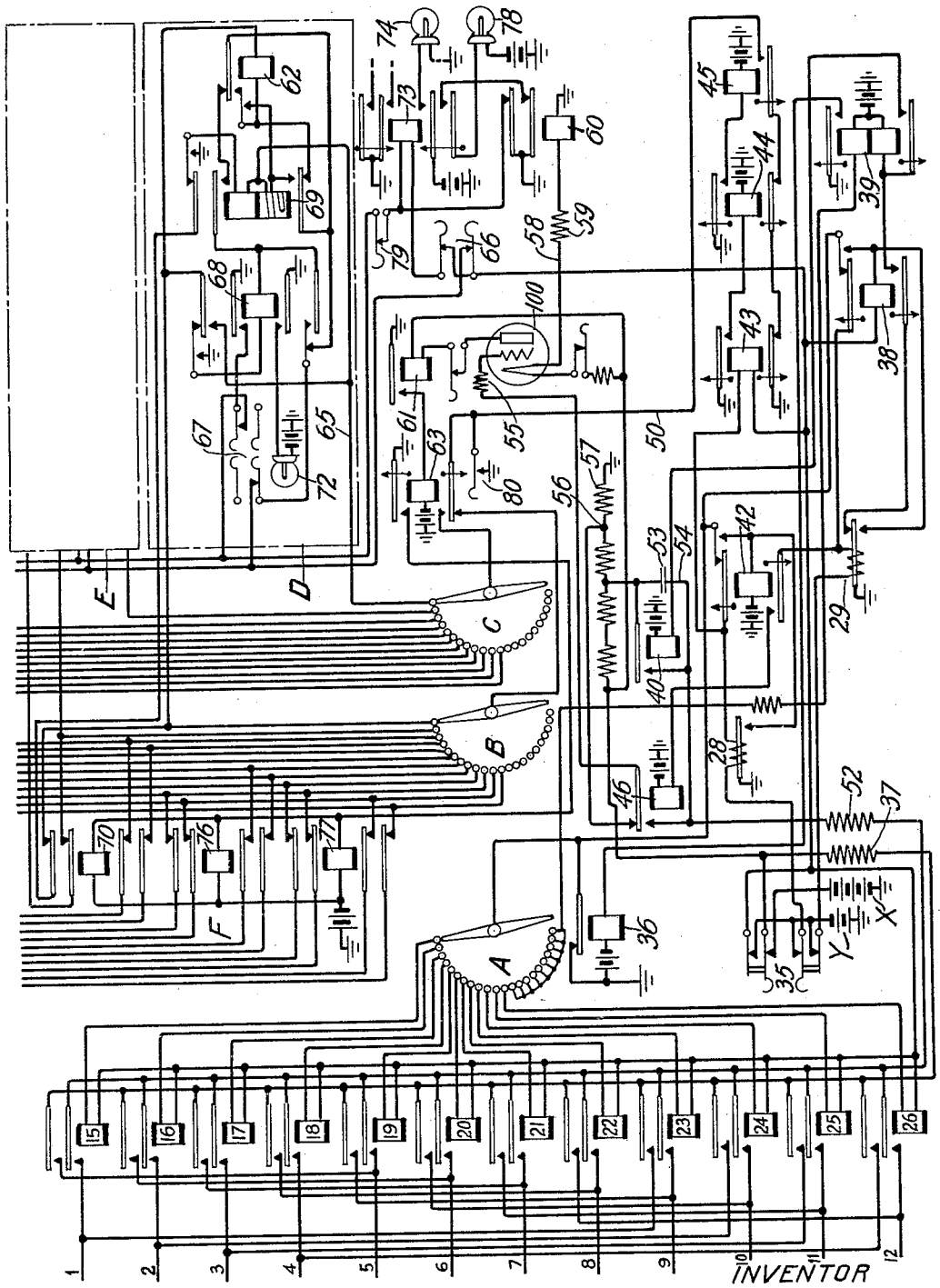

1,904,598

UNITED STATES PATENT OFFICE

FRITHIOF B. ANDERSON, OF RUTHERFORD, NEW JERSEY, ASSIGNOR TO BELL TELEPHONE LABORATORIES, INCORPORATED, OF NEW YORK, N. Y., A CORPORATION OF NEW YORK

TESTING SYSTEM

Application filed March 23, 1929. Serial No. 349,285.

This invention relates to a method of and means for testing electric conductors.

An object of the invention is to secure a more sensitive and a more reliable device for detecting the insulation characteristics of current carrying conductors.

Heretofore, devices for testing insulation leakage resistance of conductors have been used in which the conductors were first charged to certain voltages, whereby the current magnitude under continuous current conditions was determined, and including means whereby indications were made when the continuous current in said conductors has increased beyond a given magnitude. Testing systems of this type have also been provided in which a plurality of conductors are automatically tested in succession and periodically.

A feature of this invention is a system including a space discharge device for testing the insulation leakage resistance of conductors by first charging a conductor to a certain potential, determining the potential after a definite time interval, which depends on the rate of discharge during this interval due to the leakage resistance of the conductor, and then indicating the result of a comparison of potential with a predetermined value.

Another feature of the invention is a system for testing in this manner a plurality of conductors automatically in succession and periodically.

Another feature of the invention is a system for performing the test of each conductor twice with a suitable time interval intervening, before an indication is made as to its insulation characteristics. This is in order to prevent transitory abnormal electrical conditions that may exist during either of said tests from being indicated.

This invention has been illustrated in the accompanying drawing. The arrangement for testing the insulating characteristics of conductors as shown in this drawing is based upon the discharge characteristics of a conductor through leakage resistance to ground. For example, a line may have a capacity to ground of 0.1 microfarads approximately per mile of length. A 60 mile telephone line would have a capacity to ground of 6 microfarads. If this capacity is charged to 130 volts and allowed to discharge during a time interval of approximately 100 seconds, the voltage between the line and ground will decrease as the charge leaks off the line to ground through the leakage resistance of the line insulation. The potential difference between the line and ground at the end of this definite time of discharge is therefore dependent upon the leakage resistance. In this system a vacuum tube 100 is used to measure this voltage and is arranged with suitable circuits to differentiate between leakage resistance above certain critical values and leakage resistance below these values. A step-by-step selector switch having banks A, B and C is employed to periodically test the group of lines 1 to 12. The terminals of bank A are associated with relays 15 to 26 for associating the lines with the testing circuit in succession. The periodic operation of the selector switch and the testing operations are controlled by thermostatic arrangements 28 and 29 and associated chains of relays. False alarms due to temporary conditions on the lines as for example, a transient ground occuring during maintenance work, are avoided as far as possible by arrangements whereby two successive tests must show lower insulation on two successive rounds of the selector brushes before the alarm is given. For this purpose a relay arrangement such as that marked D is employed for each line cooperating with banks B and C and a relay group marked F common to all lines.

To begin a test by means of this system the key 35 is operated into the position shown on the drawing and the first effect of this operation will be the closing of circuits for relay 15 as follows: Battery Y, key 35, winding of relay 15, brush of bank A through terminal 1 to ground at the armature and back contact of the stepping magnet 36 for the switch. No test is made at this time through the operation of relay 15 but line 5 is charged through resistance 37 to 130 volts within a few seconds. The charging circuit may be traced from the 130-volt battery X, key 35, resistance 37, upper armature and front contact of relay 15 to line 5. It should be noted that relay 15 connects line 1 for test at this time but as this line has not been charged there will be no test performed. The first test will be made when relay 19 is operated to connect line 5 to the circuits attached.

The next operation of the circuits will be for the switch to move its brushes one step after an interval of approximately 30 seconds. This is accomplished as follows: When the key 35 is first operated a circuit is closed from battery Y, key 35 through the thermostatic device 29, upper armature and back contact of relay 38 to ground at the armature and back contact of the magnet 36. The thermostat 29 is arranged so that it will operate after 3 seconds approximately to close a connection to ground for the operation of relay 38 over a circuit as follows: From battery Y, key 35 through the winding of relay 38, thermostat 29 to ground. Relay 38 in operating closes a locking circuit for itself independent of the ground at the thermostat 29 through its upper make-before-break contacts to ground at the magnet 36. This relay in operating also opens the circuit for the thermostat 29 at its upper armature and back contact, so that this thermostat will now begin to cool off and it is so constructed that it will remain operated for approximately 30 seconds. When it finally opens the circuit for relay 38 it will close another circuit for the operation of relay 39 from battery to the lower winding of this relay, lower armature and front contact of relay 38 to ground at thermostat 29. Relay 39 in operating closes a circuit for the operation of relay 40 from battery through the winding of this relay, lower armatures and front contacts of relays 39 and 38 to ground at thermostat 29. The purpose of the operation of relay 40 will become apparent as the description proceeds.

Another circuit closed by the operation of relay 39 is that for the operation of magnet 36 from battery through the winding of this magnet, upper armature and front contact of relay 39 to ground. Magnet 36 in operating opens the locking circuit for relay 38 which is slow in releasing and this relay in releasing opens the operating circuit for relay 39 which is also slow in releasing. When relay 39 finally releases the circuit for the stepping magnet 36 is opened. Hence this magnet remains operated for a period equal to the time it takes relays 38 and 39 to release and is so arranged that it will cause the brushes for the switch banks A, B and C to be operated to move from terminal 1 to terminal 2 on the release of the magnet. Relay 40 is released by relay 38 and the period of operation of the relay 40 is therefore determined by the time it takes relay 38 to release. The release of relay 38 and magnet 36 closes the original circuit from battery Y for the thermostat 29 and the above described means for switching the brushes of banks A, B and C is repeated, the stepping from one terminal to another being controlled by the thermostat 29 to occur once every 30 seconds approximately. When the stepping magnet 36 operated, relay 15 was released and when it releases and the brush of bank A connects with terminal 2, relay 16 is operated to cause line 6 to be charged in the same manner as the preceding line and the succeeding lines are charged in the same manner at an interval of 30 seconds through the operation of the succeeding relays 17 to 26 on the successive movements of the brush of bank A over succeeding terminals. When relay 26 releases the brushes are advanced to the thirteenth terminal. At this time a circuit is completed for the operation of relay 39 to cause the magnet 36 to become operated to release relay 39, which in turn causes magnet 36 to release and advances the brushes to the fourteenth terminal. These operations are now repeated until the switch has completed one revolution. A second round is then started and relay 15 is again operated at this time for the purpose of not only charging line 5 but also of testing line 1 as will hereinafter be described.

It should now be observed that at the closing of key 35 and at each succeeding period of 30 seconds, another cycle of operations of relays in this circuit will take place. The first circuit closed by the operation of key 35 is that for thermostat 28 as follows: From battery Y, key 35, thermostat 28, upper armature and back contact of relay 42 to ground at magnet 36. It should also be noted that when key 35 was operated a circuit was closed for the operation of relay 43 as follows: Battery Y, key 35, winding of relay 43, upper armature and back contact of relay 42 to ground at magnet 36. When the thermostat 28 operates after approximately 1 or 2 seconds it closes an obvious circuit for the operation of relay 42. This relay in operating provides a locking circuit for itself through its upper make-before-break contact to ground at magnet 36 and opens at its upper armature and back contact the circuit for relay 43, the thermostatic device 28, which now cools in preparation for the next cycle. Relay 43 when it operated, closed an obvious circuit for relay 44 and this relay closed an obvious circuit for the operation of relay 45. Relays 43, 44 and 45 are slow in releasing and when relays 43 and 44 are released and before the release of relay 45 a circuit is completed from ground through the lower armatures and back contacts of relays 43 and 44, lower armature and front contact of relay 45 to conductor 50. This connection to ground for conductor 50 will remain for the period beginning at the release of relay 44 and ending at the release of relay 45. The purpose of this momentary connection to ground for conductor 50 at this time will become apparent as description proceeds.

As relay 38 is not yet operated when relay 42 operates, due to the fact that relay 42 operates within two seconds of the operation of key 35 as relay 38 does not operate until approximately 3 seconds after the operation of key 35, a momentary circuit is completed for the operation of relay 46 from battery through the winding of this relay, lower armature and front contact of relay 42, upper armature and back contact of relay 38 to ground by the magnet 36. The period of operation of relay 46 therefore depends on the time interval between the operation of relay 42 and operation of relay 38 and takes place as will be noted prior to the momentary operation of relay 40 during the operation of relay 39. Relay 42 releases on the operation of magnet 36 and the cycle of operations just described will be repeated once during each succeeding period of 30 seconds. The purpose of these momentary operations of relays 46 and 40 and the momentary grounding of conductor 50 during each 30 second period will become apparent as the description proceeds.

It should be noted now that after a line has been charged to 130 volts it is permitted to discharge through its leakage resistance to ground while the brush of bank A steps over three succeeding terminals, that is, line 5 will remain charged until the brush of bank A has reached the 5th terminal. At this time relay 19 is operated and a test will therefore be made at this time of the insulation characteristics of line 5. Hence each line will be allowed to discharge for approximately 100 seconds, or in other words at the end of three succeeding periods of approximately 30 seconds.

The testing of a charged line, to wit line 1, will now be described. It should be noted that when the brush of bank A is connected with the 9th terminal line 1 will be charged on the operation of relay 23 in the same manner as described for the charging of line 5. At this time line 9 will be tested as it was charged when relay 19 was operated. To simplify the description the testing of line 1 will be described and to this end it will be assumed that the switches have completed one round and that the brushes of banks A, B and C will be resting on the first terminals. A circuit for line 1 will be established as follows: From line 1 through the upper inner armature and front contact of relay 15 through resistance 52, of approximately 10 megohms, to point 54. Point 54 at condenser 53 now approaches in potential the voltage of the line 1 to ground. This voltage will be 130 volts less the amount of discharge during the proceeding 100 seconds approximately. The condenser 53 in conjunction with the resistance 52 serves to reduce the effects on the grid of the vacuum tube 100 of such parasitic E. M. F.'s that may be present on the line when connected to the vacuum tube for the test. The condenser 53 is now charged for a second or two to approach at the point 54 the potential of line 1 at this time. It should be observed that the relay 46 will now be operated for a short period, which depends as hereinbefore stated on the difference in time of the operation of relays 42 and 38. Due to this operation of relay 46 line 1 will be connected through the resistance 52 at the upper armature and front contact and through the resistance 55 to the grid of the tube 100. Resistance 55 being provided for the purpose of delaying the discharge of the condenser 53 during the test.

It should be noted that up to this point the grid of the tube has been connected to a point 56 through a resistance 57 to ground. The potential at this point is well below the filament potential and may be approximately 58 volts whereas the point 58 at which the filament is connected may be 70 volts to ground through resistance 59 and the resistance of relay 60. The plate current is therefore under normal conditions insufficient to cause the operation of relay 61. However, when relay 46 is operated to connect the grid to the line under test through the resistances 55 and 52, as heretofore mentioned, the conditions in regard to the potential difference between grid and the filament may change. That is, if the line is well insulated the grid potential will be positive to the filament potential and sufficient plate current will flow to cause the operation of relay 61, whereas if the line 1 is poorly insulated the grid potential will be below or negative to that of the filament and the relay 61 will not operate due to insufficient plate current.

Thus for example, if there is a leakage of 40 megohms on line 1, with a capacity to ground of 6 microfarads equivalent to a standard 60 mile telephone line, the grid will be somewhat less than 16 volts positive to the filament. The 16 volts will be considerably modified by the condition of discharge of the line and condenser 53 through the resistances 52 and 55 and the grid-filament resistance. In this case plate current will flow to operate relay 61. Also for example, with a 30 megohm leakage on line 1 the grid will be less than 4 volts positive, modified as a function of time as before, and in this case sufficient plate current will flow to cause the operation of relay 61. However, with a 20 megohm leakage on the line 1 the line voltage will be low and the grid will be somewhat less than 8 volts negative, modified as before but not so much as for the case of the positive grid. In this case the relay 61 will remain released as insufficient plate current will be produced. It should be understood that the values mentioned are merely arbitrarily chosen to illustrate the present case and that under service conditions the values of the various elements are determined to meet the type of lines to be tested. In the case cited 26 megohms approximately for a 60 mile, 6 microfarads line may be considered as a critical leakage resistance and hence, if the leakage encountered is 20 megohms relay 61 will remain released as an indication of a faulty line.

It should be remembered that relay 46 only remains operated for a second or two and that when it releases the grid is again returned to its original potential. Relay 40 will then operate for a short period at the end of the 30 second period as hereinbefore described. The operation of this relay causes the condenser 53 to be discharged in ample time for the test of the next line. In other words each line is charged by 130 volts and allowed to discharge through a leakage resistance for approximately 100 seconds and the voltage on the line at this time will be utilized for controlling the potential of the grid of the vacuum tube 100 to cause the operation of relay 61 or to permit it to remain released depending on the insulation characteristic as identified through the difference of potential between the grid and filament of the tube. If the standard for insulation resistance on a line is not met the relay 61 will remain released and if the insulation characteristics are better than the standard, relay 61 will operate each time a line is subjected to test. It should, however, be remembered that each line has to be subjected to two successive tests before its condition will be determined. If the insulation characteristics are the same or of the standard character at both tests the relay 61 will be operated each time and no visible indications will be made. If the insulation characteristics are below standard at one test and standard at the other test no visible indications will be made as to its condition. If on the other hand the insulation characteristics are below standard at both tests relay 61 will remain unoperated at the two succeeding tests and under these circumstances a visible indication will be made that the line is faulty.

The means for indicating when a line has a leakage beyond that allowed for a standard line will now be explained. The interval between two successive tests of a line is sufficient to permit the charging and testing of all of the other 11 lines. Banks B and C in combination with circuits, such as are enclosed in the dotted box D for each line, and the common group of relays F have been provided for this purpose. It will be remembered that at each test of a line the conductor 50 is connected to ground for a short interval. This momentary ground on conductor 50, in conjunction with relays 61, 63 and 73, controls the indicating means.

If it is now assumed that line 1, for example, is in good condition on the first test, relay 61 will as hereinbefore described be operated. Relay 61 causes the operation through an obvious circuit of relay 63 but the momentary connection to ground of conductor 50 will at this time perform no useful purpose even though this conductor is now connected through the lower armature and front contact of relay 63, the first terminal and the brush of bank C to a conductor 65 of the relays in box D. Hence no indications are made under these circumstances nor are any indications made at the testing of line 1 the second time if it is still in good condition. If the line 1 is in a faulty condition at the second test, either due to a temporary condition or a permanent condition that has occurred since the preceding test, relays 61 and 63 will not operate, and hence at this time the ground on conductor 50 causes a circuit to be closed for the operation of relay 62 as follows: Battery Y, keys 35, key 66, key 67, lower make-before-break contacts of relay 68, lower armature and back contact of relay 69, winding of relay 62, first terminal of bank B and the brush thereof, lower armature and back contact of relay 63, conductor 50 to ground. Relay 62 in operating connects battery to its armature and front contacts for the windings of relay 69 so that this relay will now operate from the ground on conductor 50 as follows: Battery Y, key 35, key 66, key 67, lower make-before-break contact of relay 68, lower armature and back contact of relay 69, front contacts of relay 62, windings of relay 69, upper armature and back contact of relay 69, upper outer armature and back contact of relay 70, brush and first terminal of bank B, lower armature and back contact of relay 63 to ground of conductor 50. Relay 69 in operating provides a locking circuit for itself from battery Y and as hereinbefore traced through its lower armature and in this case through the front contact, its windings and upper make-before-break contacts to ground. The operation of relay 69 opens the original energizing circuit for relay 62 at the lower armature and back contact. Relay 62 is released when the ground is removed from conductor 50.

From now on either the circuits in box D will function to cause lamp 72 to light in case the line is still faulty on the third test or if it is cleared relay 69 will release. When therefore line 1 is tested a third time and if this line is still in a faulty condition as determined by the relays 61 and 63 remaining released, the ground on conductor 50 causes the operation of relay 68 over a circuit as follows: From battery Y at the key 35, key 66, key 67, lower make-before-break contacts of relay 68, armature and back contact of relay 62, upper inner armature and front contact of relay 69, winding of relay 68, upper outer armature and back contact of relay 68, brush and first terminal of bank B, lower armature and back contact of relay 63 to ground at conductor 50. Relay 68 in operating provides a locking circuit for itself to ground at its upper make-before-break contacts. Relay 68 operating also closes an obvious circuit for the lighting of lamp 72 to indicate that a faulty condition exists on the line 1. Relay 68 in operating also closes a circuit for the operation of relay 73 from battery Y, key 35, key 66, winding of relay 73, key 79, key 67, upper inner armature and front contact of relay 68 to ground. Relay 68 in operating establishes a connection from ground on conductor 50 through its upper outer armature and front contact to the midpoint between the windings of relay 69 causing it to release. Relay 73 in operating closes an obvious circuit for the lighting of the common alarm lamp 74 to indicate that a line under test is below standard condition.

In case the voltage conditions on line 1 at the second test were due to a temporary condition and cleared before the third test was made on this line, the circuits enclosed in the box D are returned to normal condition at the time of the third test. In this case relay 63 will operate to indicate that the line is in standard condition. When this takes place the ground on conductor 50 is connected to the windings of relay 69 as follows: From ground on conductor 50, lower armature and front contact of relay 63, brush and first terminal of bank C, conductor 65, and to a point between the upper and lower windings of relay 69. The upper winding of this relay is therefore shortcircuited and relay 69 is released thus preventing the operation of lamp 72 to indicate the temporary faulty condition. It is therefore evident that it requires two successive tests on the same line in order to cause the relays enclosed in box D to function to light lamp 72 in case the faulty condition remains during the two tests, or to prevent the operation of this lamp in case the faulty condition was merely of a temporary nature.

It should be observed that relays and circuits such as are enclosed in box D are also provided for the other lines under test, the equipment for the second line having been identified by means of a box marked E. Relays 70, 76 and 77 are connected in a circuit that is controlled by relay 63 through its upper armature and front contact so that each time relay 63 operates, these relays are also operated to prevent the operation of the relays individual to the lines as shown in box D and controlled through the conductors leading into such boxes. That is, the operation of relays 70, 76 and 77 prevent the lighting of lamps corresponding to lamp 72 when relays corresponding to relay 69 are released. Such operations may otherwise occur in case relays corresponding to relay 68 should operate while relays corresponding to relay 69 are releasing. It should be noted that the ground at the make-before-break contacts of such relays corresponding to relay 69 are temporarily connected to the upper outer armature of such relays.

It should now be observed that relay 60 is normally operated when the connection is completed for the filament from battery X by the operation of key 35. In case the filament burns out, relay 60 will be released and thus cause the operation of relay 73 over a circuit from battery Y, key 35, key 66, winding of relay 73, upper outer armature and back contact of relay 60 to ground. Relay 73 in operating will then close not only a circuit for the lamp 74, but also the circuit for lamp 78 to indicate the failure of the filament current. Relay 60 in operating when a new vacuum tube has been inserted releases relay 73. When key 73 is operated relay 73 is rendered unresponsive to the operations in the circuits of D or E. Key 66 when operated causes relays such as 68, 69 and 73 to release in case any are operated at this time.

Key 67 is provided to release signals 72 and 74. When this key is operated to the left, relay 68 is released or relay 69 if either is locked up. If relay 68 is locked up, its release will allow relay 73 to release unless, of course, this relay is operated by any other individual circuit. If key 67 is operated to the right, relay 73 will be released, provided, of course, it is not held up by the individual circuits of some other line. The operation of key 80 connects ground to the armature and back contact of relay 63 and the brush of bank B for relays 68, 69 and 62 of the corresponding lines. On the first operation of the key 80 if the brushes of the selectors are on the first terminal, relay 69 is locked up and on the next operation relay 68 will be operated and thus cause the operation of lamp 72. Lamp 72 thus lighted indicates the line under test. In order to be effective in this respect, the key 80 should be operated while relay 63 remains released during the testing cycle.

It should be understood that while the application of the invention has only been illustrated in connection with one system it may readily be applied to other systems and that it should be limited only by the scope of the appended claims.

What is claimed is:

1. The method of testing the insulation of a conductor which comprises charging the conductor to a definite potential, permitting the conductor to discharge for a definite period, determining the potential of said conductor at the end of said period, determining whether the potential at the end of said period is above or below a definite value, and indicating the result of said determination.

2. A device for testing the insulation leakage resistance of a plurality of conductors comprising means for charging said conductors in succession to a definite potential, means for determining the potential of each conductor a definite time interval after the charging thereof, means for indicating whether the changed potential of each conductor after said time interval is above or below a certain value, and means for periodically repeating the tests of said plurality of conductors.

3. A system for testing the insulation leakage resistance of a conductor comprising means for charging the conductor to a definite potential, means for determining the potential after a definite time interval, means for comparing the determined potential with a given value of potential, means for repeating said charging of the conductor and the determining and comparison of potentials, and means for indicating when the determined potential after two succeeding tests of the conductor bears certain relations to the given potential.

4. A system for testing the insulation leakage resistance of a conductor comprising means for charging the conductor to a definite potential, means for determining the potential after a definite time interval, means for comparing the determined potential with a given value of potential, means for repeating said charging of the conductor and the determining and comparison of potentials, a signal, and means for operating said signal if the determined potentials after two succeeding tests of the conductor bear certain relations to the given potential and for preventing said signal from operating if the determined potentials after two succeeding tests of the conductor bear certain other relations to the given potential.

5. A system for testing the insulation leakage resistance of a plurality of conductors in succession and periodically comprising means for charging the conductors to a definite potential, means for determining the potential of each said charged conductors after a definite time interval, means for comparing each determined potential with a given potential, and means for indicating for each conductor after two succeeding tests whether the determined potentials when compared with the given potential bear certain relations to said given potential.

6. A system for testing the insulation leakage resistance of a plurality of conductors in succession and periodically comprising means for charging the conductors to a definite potential, means for determining the potential of each said charged conductors after a definite time interval, means for comparing each determined potential with a given potential, a signal for each conductor, a common signal, and means for actuating the signal for each conductor and the common signal after two successive tests of each conductor when the compared potentials of said tests bear certain relations to the given potential and for preventing the actuation of the individual signals and the common signal if the compared potentials after said tests bear certain other relations to the given potential.

7. A system for testing the insulation leakage resistance of a conductor comprising a space-discharge device having an input circuit and an output circuit, relay means in the output circuit, a source of current, circuit means associated with said source of current for maintaining a certain potential on the control element of said space discharge device and a certain other potential on the filament element of said device with the control potential slightly negative as compared with the filament potential and sufficient to prevent output current from operating the relay means in the output circuit, time controlled circuit and relay means for connecting said conductor to said source of current, for a short period for then maintaining the conductor disconnected for a longer period, and for thereafter disconnecting the control element from the source of current and connecting the conductor to said control element, the relay means in the output circuit being operated only if the potential on the conductor when connected to the control element charges such element to a positive potential in relation to the filament potential.

8. A system for testing the insulation leakage resistance of a conductor comprising a space-discharge device having grid, filament and plate electrodes, an alarm circuit means connected between the filament and the plate electrodes, means for normally maintaining said grid at a potential to prevent the operation of the alarm circuit means, means for charging said conductor to a certain potential, means for thereafter permitting said conductor to discharge for a certain period through its own leakage path to ground, and means for disabling the means for maintaining the grid at a certain potential and for connecting said conductor to the grid to charge the grid to the potential of said conductor to cause the operation of the alarm circuit means if the potential on the conductor is below the normal potential on the grid.

9. A system for testing the insulation leakage resistance of a plurality of conductors in succession and periodically comprising a space-discharge device having grid, filament and plate electrodes, an alarm circuit means connected between the filament and the plate electrodes, means for charging said conductors in succession to a certain potential, means for permitting said conductors to discharge for a certain period through their own leakage paths to ground, and means for alternately maintaining said grid at a certain normal potential to prevent the operation of the alarm circuit means and connecting said grid in succession to the conductors that have been permitted to discharge through their leakage paths to charge the grid to the remaining potentials on said conductors to cause the alarm circuit to operate each time the potential of a conductor connected with the grid is below the normal potential of the grid.

10. In a system for testing the insulation leakage resistance of a conductor comprising a space-discharge device and grid, filament and plate electrodes, an output circuit including a relay connected between the filament and the plate electrodes, means for normally maintaining said grid at a potential to prevent the operation of said relay, means for charging said conductor to a certain potential, means for thereafter permitting the said conductor to discharge for a certain period through its own leakage path to ground, means for disabling the means for maintaining the grid at a certain potential and for connecting said conductor to the grid to charge the grid to the potential of the conductor for causing said relay in the output circuit to operate if the potential of the conductor is above the normal potential on the grid, an alarm device, means for repeating said test of the conductor at intervals, and means responsive to the operation of said relay after two succeeding tests for operating said alarm device.

11. The method of testing the insulation of a conductor which comprises charging the conductor to a definite potential, determining the potential after a definite time interval, determining whether the potential at the end of said time interval is above or below a definite value and indicating the result of said comparison.

12. A device for testing the insulation of a conductor comprising means for charging the conductor to a definite potential, means for determining the potential after a definite time interval, means for determining whether said changed potential at the end of said time interval is above or below a definite value and means for indicating the result of said comparison.

In witness whereof, I hereunto subscribe my name this 21st day of March 1929.

FRITHIOF B. ANDERSON.